(12) United States Patent  
Staykoff

(10) Patent No.: US 8,938,494 B2  
(45) Date of Patent: Jan. 20, 2015

(54) GENERIC SMART USSD CLIENT MODULE EMBARKED IN A TELECOMMUNICATION TERMINAL

(76) Inventor: Constantin Staykoff, Sofia (BG)

(*) Notice: Subject to any disclaimer, the term of this patent is extended or adjusted under 35 U.S.C. 154(b) by 42 days.

(21) Appl. No.: 13/377,962

(22) PCT Filed: Jun. 15, 2010

(86) PCT No.: PCT/IB2010/052686  
§ 371 (c)(1),  
(2), (4) Date: Dec. 13, 2011

(87) PCT Pub. No.: WO2010/146541  
PCT Pub. Date: Dec. 23, 2010

(65) Prior Publication Data  
US 2012/0089674 A1    Apr. 12, 2012

(30) Foreign Application Priority Data  
Jun. 17, 2009  (FR) ...................... 09 02933

(51) Int. Cl.  
*G06F 15/16*    (2006.01)  
*H04L 29/08*    (2006.01)  
(Continued)

(52) U.S. Cl.  
CPC ............ *H04L 67/2823* (2013.01); *H04L 67/02* (2013.01); *H04L 69/08* (2013.01); *H04L 67/289* (2013.01); *H04M 1/72525* (2013.01)  
USPC ...................................................... 709/203

(58) Field of Classification Search  
CPC ..... H04W 4/24; G06Q 40/02; H04L 63/0428; H04L 67/2823; H04L 67/02; H04L 67/289; H04L 69/08; H04M 15/41; H04M 1/72525; G06F 17/301  
USPC .................................................. 709/203, 249  
See application file for complete search history.

(56) References Cited

U.S. PATENT DOCUMENTS 6,477,366 B1 *  11/2002  Valentine et al. ............ 455/416  
6,501,948 B1 *  12/2002  Salin ............................ 455/417  
(Continued)

FOREIGN PATENT DOCUMENTS

KR    100628769 B1    9/2006  
WO    2005079084 A    8/2005

OTHER PUBLICATIONS

USSD Menu Browser; XP 0025754162m pp. 1-3, Aug. 1, 2007).  
(Continued)

*Primary Examiner* — Eleni Shiferaw  
*Assistant Examiner* — Gregory M Elmore  
(74) *Attorney, Agent, or Firm* — Bill Killough; Barnwell Whaley Patterson & Helms

(57) ABSTRACT

A digital telecommunications system communicates with an unstructured supplementary service data protocol by a digital application located on a mobile terminal. The digital application includes a navigation module, a presentation module, an interpreter module and an encryption module. The digital application interprets data received from an unstructured supplementary service data protocol that communicates with a telecommunications network and displays interpreted data on a screen of said mobile terminal from data received from the unstructured supplementary service data protocol. The digital application interprets a request of a user entered into the mobile terminal in response to the interpreted data displayed on the screen of the mobile terminal, and sends from the mobile terminal data interpreted from the request of the user to the telecommunications network by the unstructured supplementary service data protocol.

28 Claims, 4 Drawing Sheets

(51) Int. Cl.
*H04L 29/06* (2006.01)
*H04M 1/725* (2006.01)

(56) References Cited

U.S. PATENT DOCUMENTS

2003/0187999 A1* 10/2003 Callum .......................... 709/229
2008/0064385 A1* 3/2008 den Hartog et al. ......... 455/422.1
2008/0146204 A1* 6/2008 Gu et al. ..................... 455/414.1
2009/0011745 A1 1/2009 Cha
2009/0061943 A1* 3/2009 Kamgaing-Kouam ....... 455/566

OTHER PUBLICATIONS

Database WPI Week 200731, Thomson Scientific, London, GB, AN 2007-319858.
USSD Services for Interactive Mobile Users—Building User-Friendly Mobile Telephony Applications Using Dialogic TM Distributed Signaling Interface Components, pp. 1-17.

* cited by examiner

GENERIC SMART USSD CLIENT MODULE EMBARKED IN A TELECOMMUNICATION TERMINAL

Applicant claims priority of Application PCT/IB2010/052686 filed Jun. 15, 2010, which claimed priority from French application Ser. No. 09/02933 filed Jun. 17, 2009, and from which Applicant also claims priority.

FIELD OF THE INVENTION

This invention relates to a generic smart USSD (Unstructured Supplementary Service Data) client module embedded in a telecommunication terminal.

BACKGROUND OF THE INVENTION

The present invention relates to conversational client-server applications, and more particularly, relates to the field of dynamic dialogues between a mobile telecommunication terminal and a network or a server for applications and services, using interactive interfaces. The invention provides to the terminal to reach a server or other terminals, dialogue, navigate, exchange information, download applications and data (text, video, audio, images and other), and use different applications and services.

The present invention relates to mobile telephony, expanding new features and interactive services, and a convergence of dialogue between heterogeneous devices, such as mobile phones, mobile devices, digital applications and services platforms, Internet servers, third parties services and equipments, and others. Moreover, the invention provides the additional requirement of highly useful ergonomics for terminal users, such as real time services requirements, which are in accordance with the resource constraints of mobile infrastructures (servers, networks bandwidths, real time constraints) and mobile terminals (limited processing, storage and display capacities).

A technical problem to be solved is thus to provide generic client-server systems, to implement and use protocols, with dynamic, interactive, intuitive features, that are easy to use and also allow fact integration, and with low resources consumption. To this need is added the requirements of interoperability, customization and deployment.

Consequently, a technical problem to be solved is to provide a client-server system for applications and services allowing the set up of multiple and reusable applications and services with the lowest possible costs, targeting a large number of users. An objective is also to satisfy the requirement to have interactive services compliant with existing and emergent technologies, without costly implementations, and preferably, with few modifications of the equipment managed by network operators. Another objective is the requirements of providing such applications and services, with few modifications to the user terminals, while providing a dynamic, interactive, user-friendly interface, and satisfying real time constraints.

An important objective is to have means to reach a variety of information with only short delays. Also, this objective relates to obtaining information via the telecommunication network from a mobile terminal in local mode, or in roaming or nomad mode.

Thus, the significant capacity constraints of the terminals must be taken into account, as well as network performance and inherent ergonomics problems.

Furthermore, in client-server systems the problem exists of distributing the "intelligence" of different portions of 25 services between the network and the terminal.

The term "intelligence" includes the capability to decide the management or the execution of an action, a process, or data processing. For example, "intelligence" is used with the aim of providing complementary functional possibilities, flexibility and independence, versus constraints and/or users needs.

In order to address this problem, various documents of the prior art relate to embedded clients on mobile terminals, either compliant with the networks and mobiles terminals constraints, at the expense of ergonomics, or providing functional and user-friendly user interface, at the expense of the quality of service (response time, number of proposed services).

These documents provide technical solutions to the client-server model, for which a client connects to a server with special means to reach information, navigate, download, save or transfer applications and data.

The prior art provides different approaches which, however, address only limited and punctual aspects of this problem, without solving the global technical problem, i.e. to find and optimal point between the equipments constraints (networks and terminals), real time aspects, ergonomics and number of features and services.

Concrete applications and services are possible based on navigation using standard protocols that are WEB like (World Wide W6eb or Internet), such as HTTP protocols (Hypertext Transfer Protocol), XML (Extended Markup Language, and extended markup language for describing and analyzing date), IP (Internet Protocol) or others, in combination with standard transport protocols TCP (Transmission Control Protocol, one of the basic protocols for IP data transmission), UDP (User Datagram Protocol; protocol for data transmission being part of the TCP/IP protocol) and others, which do not guarantee the desired response time for the queries, therefore failing with regard to the real-time services constraint.

Another approach known from the prior art is to limit the scope of the access to some services and applications based on simplified protocols taking into account the limited capabilities of mobile phones, for example the WAP protocol (Wireless Application Protocol), especially designed for mobile phones. However, this approach is at the expense of ergonomics aspects and multi services, without ensuring compliance with real-time services.

Finally, a major effort is focused on clients applications embedded in mobile phones that satisfy the characteristics of ergonomics and aesthetics. However, they unfortunately require installing dedicated software on the terminal, which is demanding in terms of mobile terminal resources, but does not guarantee real-time services.

U.S. Pat. No. 7,103,018 relates to a communication terminal initiating a WAP session (Wireless Session Protocol) by sending a query to the server. The query includes an identification of the required data, as an identification number provided from the server. According to this identification number of the terminal, i.e. of the user, the server identifies the terminal versus identification data in a database associated with this user. Information regarding user's profile indicates the data format that can be managed by the terminal. When the server responds to the request, it sends data corresponding to the format defined by the user profile.

However, this document is limited to a data type predetermined by the profile of each user, by the data format to be sent and by the capacity of transport channels and does not offer the flexibility of a WEB browser type. Based on WAP technologies, this solution provides neither a guaranteed response time, nor a high level of ergonomics.

WO 03030026 concerns the redirection of content from a content server, by applying a special definition for this content. The content and the accompanying definitions are then sent to the device over the cellular network. The browser installed on the device is programmed to recognize the definition and to put an appropriate indicator on the content, the indicator defines how the device uses the contents, especially by defining that the content will not remove this content from the memory, even emptying the cache to free up disk space.

Nevertheless, this document proposes data and content recognition according to the mobile terminal capabilities and is limited to a restricted number of features, services, uses and data access.

EP 1874018 relates to markup language specifications that are defined to provide pseudo-rich media during phone calls, and implements two end times that support these specifications. Each implemented end items functions as mid-phone and mid-navigator, where the telephone call is partly a traditional duplex audio stream between the callers, completed by pseudo-rich media transmitted from one to the other. However, data and voice applications are distinct and the data are transmitted through separate channels, i.e. a splitting is applied in steps to request content from a given channel and steps to receive data from several other separate channels.

Also, many documents of the prior art relate to navigation clients embedded in mobile devices, having aesthetic and ergonomic user interfaces, which are allowed to reach standard WEB pages, to display the WEB pages and to navigate them. However, this high level of ergonomics and diversity are provided to the detriment of the quality of service, in terms of guaranteed channel and response time, and are of high complexity in terms of implementation resources.

In summary, the prior art does not proposed entire complete services such as navigation in real time, nor does the prior art satisfy the requirements and objectives of the above mentioned client-server systems for mobile telecommunications.

SUMMARY OF THE INVENTION

A digital telecommunications system communicates with an unstructured supplementary service data protocol by a digital application located on a mobile terminal. The digital application includes a navigation module, a presentation module, an interpreter module and an encryption module. The digital application interprets data received from an unstructured supplementary service data protocol that communicates with a telecommunications network and displays interpreted data on a screen of said mobile terminal from data received from the unstructured supplementary service data protocol. The digital application interprets a request of a user entered into the mobile terminal in response to the interpreted data displayed on the screen of the mobile terminal, and sends from the mobile terminal data interpreted from the request of the user to the telecommunications network by the unstructured supplementary service data protocol.

DESCRIPTION OF THE DRAWINGS

The present invention will be better understood when considering the attached reference figures showing respectively.

DESCRIPTION OF PREFERRED EMBODIMENTS

Figure 1A:
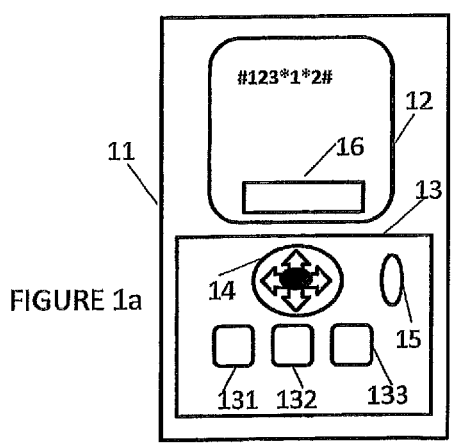
FIGS. 1a, 1b, 1c and 1d present a user interface, as well as navigation steps for a mobile terminal not having an embedded USSD client module.

The present invention is based on standards and existing protocols, including USSD (Unstructured Supplementary Service Data), open and already implemented in a native way in the devices, and fully or partially available. It is based on native networks and terminal features by offering a generic client-server system, which provides multiple applications and multiple services. The present invention relates to a generic smart USSD client module embedded in a telecommunication terminal.

In the present invention, the term "client" is understood to mean an application having its own embedded navigator, or using a third embedded navigator, the application itself being embedded in the terminal and not in the telecommunication network. This network is, for example, a GSM (Global System for Mobile), GPRS (General Packet Services, communications system with access using packets services), UMTS (Universal Mobile Telecommunications System), 3G/3G+ and/or any other network such as (Next Generation Network).

The present invention addresses the weakness of the prior art via a client-server system based on standard network protocols such as USSD, where the server for applications and services is located in a core telecommunications network, a computer network, or another network. This server for applications and services is based on an interpreter of a structured by conversational objects language, such as XML (Extensible Markup Language), VXML (Voice Extensible Markup Language), language voice extended tagging (which means an application programming interface for communication using peripheral devices related to the telephony), or another.

The user equipment, such as a terminal, is for example, a mobile phone (such as a cell phone), a PDA (Personal Digital Assistant; handheld computer combining many functions), a multi-functions board computer, or similar for a vehicle, a home or business multi-platform, including, for example a monitoring or safety function, or any other fixed or mobile device being able to communicate with at least one network.

In the present invention, the term "user" is understood to mean an individual subscriber, fixed, nomadic or "Roamer" (itinerant subscriber in the sense of "roaming" between networks) to at least one network, or a third party, for example a provider of applications, of services, of content or of any equipment (for example, alarm or signaling equipment).

The purpose of the present invention is a client application embedded in a mobile telecommunications terminal that is able to communicate and to share data with a server and/or a network, based on real time telecommunications protocols such as USSD. The client satisfies requirements for real time, low resources consumption, multi functions and integration with its own ergonomics, or with third party ergonomics used in the terminal.

In its most general meaning, the present invention relates to a digital telecommunications client system based on at least one USSD protocol, with the USSD client, being located in at least one mobile terminal and including means for:

Receiving and interpreting at least one data and/or at least one instruction from at least one telecommunications network;

Displaying as text and/or graphic on a screen and presenting on the terminal at least one data and/or at least one instruction from the network;

Interpreting and sending back to the network at least one request and at least one message of at least one user, in function of at least one data and/or at least one presented service;

Communicating with at least one server of at least one third party such as any USSD server, on-device-portal server or other suitable device.

Advantageously, the USSD client includes at least one transport module including at least one encryption module, at least one decoder interpreter module and at least one presentation module.

In one embodiment, the USSD client includes at least one navigation module.

In another embodiment, the navigation module is a third party and/or terminal specific application.

In one implementation, the USSD client is based on at least one interpreter of structured languages such as HTML or XML or VXML or CCXML or other suitable language.

In another implementation, the presentation module is a transformation module to any presentation language and includes means for modifying the processed contents (modification, filtering, suppression, content addition and other).

In a preferred embodiment, the USSD client includes means for operating as an USSD server versus at least one other terminal and/or at least one network.

The present invention also relates to a processing method implemented by the USSD client system which is composed of at least:

A step for sending at least one query from at least one user with an USSD client to a telecommunications network, opening a session between the USSD client and the network;

A step of query interpretation from the network, followed by a return of at least one information to at least one terminal;

A step of processing of the received information by the USSD client and of displaying of the information as text and/or graphic on a screen of the mobile terminal;

A step of choice and validation of at least one choice by using at least one simple pressing on a keyboard;

A step of sending the user choice to the network;

A step of interpreting the choice by the network and sending back at least one requested information;

A step of displaying the received choice on the user's screen.

Advantageously, the step of choice and validation of at least one choice is performed with at least one simple pressing on specific text and/or graphic areas, by using at least one key of a keyboard of the terminal.

In a first embodiment, the method includes a step of support and management of at least one feature "ringing" by the user and/or by the network service.

In a second embodiment, the method includes a step of support and management of at least one feature advertisements and/or customized information during at least one user session, the advertisements and/or customized information being dynamic or static.

In a third embodiment, the method includes a step of support and management of the proprieties of the terminal and of the network to which the terminal is attached.

In a fourth embodiment, the method includes a step of support and management of at least one additional feature, relative to at least one application available on the terminal.

In a fifth embodiment, the method includes a step of support and management of at least one feature "USSD bookmark."

In an embodiment, the method includes a step of externalization of at least one content of at least one current page, and/or of at least one session or portion of a session, the step of externalization being a backup or archive or transfer from the USSD client to any external application.

In another embodiment, the method includes a step to restore at least one session on the mobile terminal.

In a preferred embodiment, the method includes a step of visual management of at least one session, including the duration of the session, as well as the duration of the user's interactivity during the session and a verification of continuity of the session.

In another preferred embodiment, the method includes a step of management of one or many USSD messages as at least one USSD message, the virtual USSD message.

Advantageously, the virtual USSD message includes text, images, graphics or audiovisual contents.

In one implementation, the method includes a step of simulation and/or management of at least two USSD sessions, activated in parallel for the same terminal.

In another implementation, the method includes a step of customization of at least one service for at least one user by the USSD client and/or remotely by the network.

In a preferred embodiment, the method includes a step of encryption, with or without visual indication of the data and/or of services, with at least one custom security key or with at least one security automatically managed by the client and by the server.

The present invention will be better understood when considering the non-limiting embodiment described below.

In the classical case, an USSD message is sent by typing on the terminal keyboard a sequence, for example, *123*1*2#, followed by pressing an "Enter" key.

When an USSD message is emitted from the mobile, it is always directed to a "home network," in which there is an USSD equipment, such as an USSD server with a browser, in the present invention "USSD Center." This network USSD Center interprets the USSD query and then sends back a requested information and/or menu.

For instance, a menu with list of choices is displayed on the terminal screen, where every choice is, for example, a number 1, 2 or 3. In order to make a choice, the user has to press the right number on the keyboard, and then validate by using another key.

This manual USSD navigation mode doesn't need any modification in the user terminal and the network services are directly usable. However, this solution for USSD navigation is not satisfactory from ergonomics and usability point of view.

The user wastes a lot of time in manual interaction. Also, with increasing complexity of mobile terminals in term of features, a complementary technical problem occurs: the user phone is more complicated (for example, having extended keyboard, special and complementary keys, touch screen, "smart phone" evolution (evolved cell phone offering personal assistant features) and other devices. lit therefore becomes more difficult for the user to navigate by pressing different keys.

The embedded mobile USSD client, purpose of the present invention, contributes for an enriched user experience via advantages such as ergonomics, especially improving and multiplying networks services in regards to various topics such as security, facility to connect and maintain the connection, response time and information access time, new features, services and data customization, and other advantages.

In the present invention, the term "data" is understood to mean at least one information and/or at least one instruction, and/or at least one structured or unstructured content, the data being textual, graphic, audiovisual or any other type.

The availability in the terminal of an embedded USSD client that is equipped with a browser having a user navigation interface overcomes the aforementioned drawbacks of the prior art. The client is installed as a standard application in the mobile phone. The browser included in the client is based on at least one structured language interpreter (for example, HTML (Hypertext Markup Language) descriptor, XML, VXML, CCXML (Call Control XML; XML for the call control feature) or other.

In another embodiment the client does not include a navigator, and cooperates with at least one navigator, or with an application specific to the terminal.

FIG. 1 (1a, 1b, 1c and 1d) presents user interface and navigation steps for a mobile terminal not having an embedded USSD client module.

The module (11) is a cell phone with screen (12) and keyboard (13), including keys, for example (131) (corresponding to number 1), (132) (corresponding to number 2) and (133) (corresponding to number 3). A navigation key (14) allows navigation via keystrokes (left, right, up, down) and selection via a central keystroke.

A Validation key (15) or standard "enter" key is also available. Navigation steps are detailed in FIG. 1a, 1b, 1c and 1d.

When user decides to connect to the USSD Center, he/she types on keyboard (13) an USSD code, for example: #123*1*2#. This code is then sent to the USSD Center, a session is opened and the USSD Center returns back the required menu displaying on screen (12) for example:

Welcome
1. My package and options
2. My bank
3. My city
4. My house

The item "My bank" is an example of service with encrypted USSD session, the item "My city" is an example of service for Internet information retrieval via USSD and the item "My house" is an example of service for house automation management via two USSD terminals.

Figure 1B:
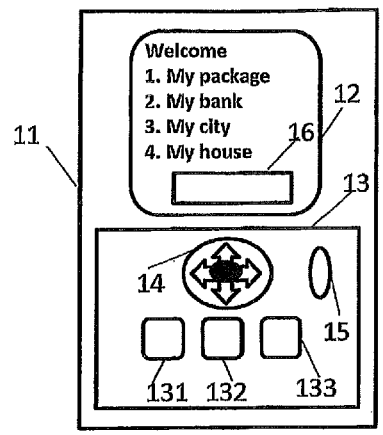
Figure 1C:
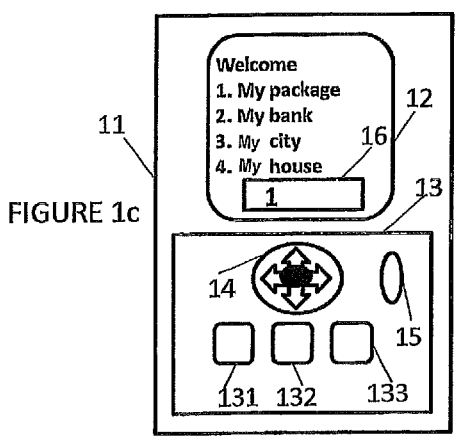
Figure 1D:
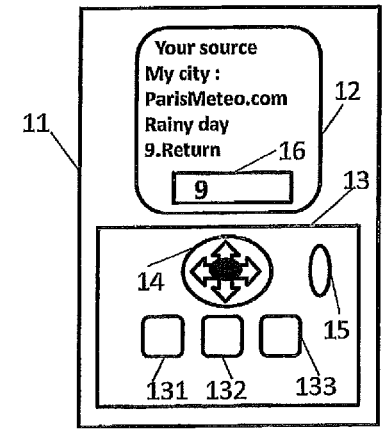

In this case, the navigation method includes the next steps:

A step for an USSD code dialing on keyboard (13) and dialing validation via pressing key (15), as shown on FIG. 1a;

A step for a connection and menu display, as shown on FIG. 1b;

A step for making a choice with keyboard (13) via keys (131), (132), or (133); this choice being then displayed in a window (16) on the bottom of the screen (12), and then confirmed using validation key (15), as shown on FIG. 1c;

A step of displaying the selected content, as shown on FIG. 1d, which displays at least one required piece of information, for example:
Your source My City:
ParisMeteo.co
Rainy day
Return When the user wishes to come back for example in the previous menu, he/she presses on the keyboard the displayed number, as per screen (16) and then confirms the validation key (15) for example.

FIGS. 2 (2a, 2b, 2c and 2d) presents a non-limiting embodiment where the mobile terminal has embedded USSD client.

When the user requests for a service, he/she connects directly through the user interface of the mobile terminal, for example presented as icons (21), (22), (23) and so on, proposed on screen (12) of mobile terminal (11). The USSD Client (24) is available and accessible directly or not, via the interface. By using navigation key (14), the user selects and activates the USSD client (or a cooperating application).

Figure 2A:
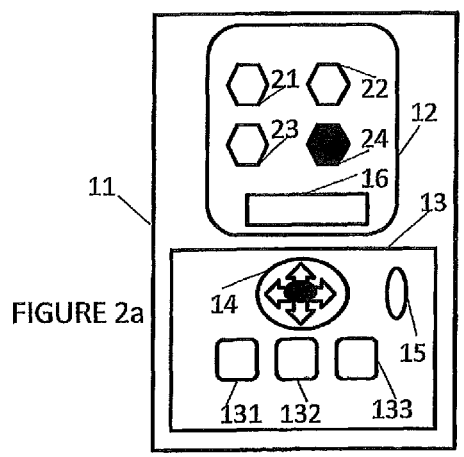
FIGS. 2a, 2b, 2c and 2d present a user interface, as well as navigation steps for the USSD client embedded in the mobile terminal, purpose of the present invention.
Figure 2B:
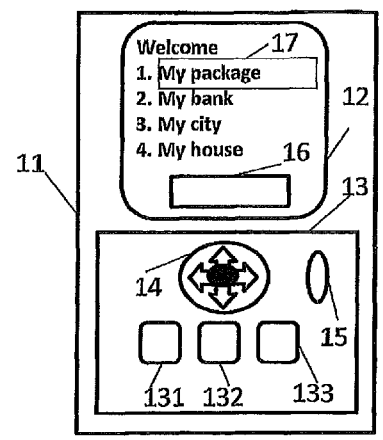
Figure 2C:
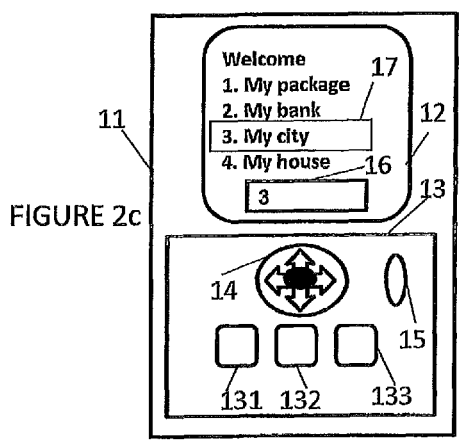
Figure 2D:
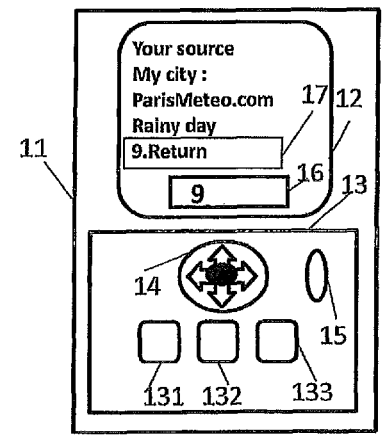

A list of predefined and customizable USSD favorites "Bookmarks," also known as "signets" in French, is then displayed. When the user makes a choice, the corresponding USSD query is sent to the network and its returns back a menu of request services, for example the following menu:
Welcome
1. My package and options
2. My bank
3. My city
4. My house In this case, the navigation method includes the following steps:

A step for scrolling via navigation key (14), positioning on icon (24) and validating via central press on navigation key (14), as shown on FIG. 2a;

An optional step for displaying a predefined and customizable list of bookmarks and possible options in this list;

A step for automatic sending of USSD query to the network, followed by menu displaying, as shown in FIG. 2b. A selection cursor (17) is indicated, designating an initial default location in the displayed menu;

A step for scrolling selection cursor (17) by using navigation key (14) and validating the made selection via navigation key (14), as shown on FIG. 2c. After selection, user choice is automatically displayed in a window (16) on bottom on the screen (12);

A step for displaying the selected content is shown on FIG. 2d, for example:
Your source
My city:
ParisMeteo.com
Rainy day
Return Advantageously, navigation and choice selection are done, for instance, by using validation key (15) or by using navigation key (14), or by using an predefined key of the digital keyboard (13) or by using a "softkey" (virtual dynamic key).

Advantageously, validation key (15) is merged with navigation key (14).

Figure 3:
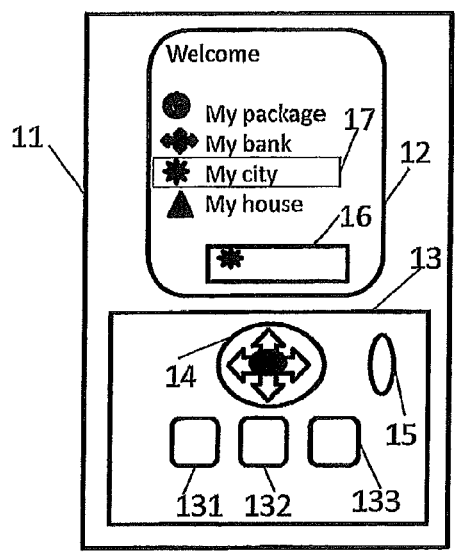
FIG. 3 presents a particular embodiment of the user interface for the USSD client, purpose of the present invention, embedded in the mobile terminal.

FIG. 3 represents a particular embodiment of FIG. 2b, an example of improvement by using graphical elements for presentation of menu lists displayed after a user request. In one implementation, the graphical elements are sent by the network. In another implementation, a stock of graphical elements are in the terminal an used by the client for display. The use is predefined and customizable by the USSD client, or remotely by the network. In a preferred embodiment, the presentation of menu lists is performed entirely with graphical elements.

Figure 4:
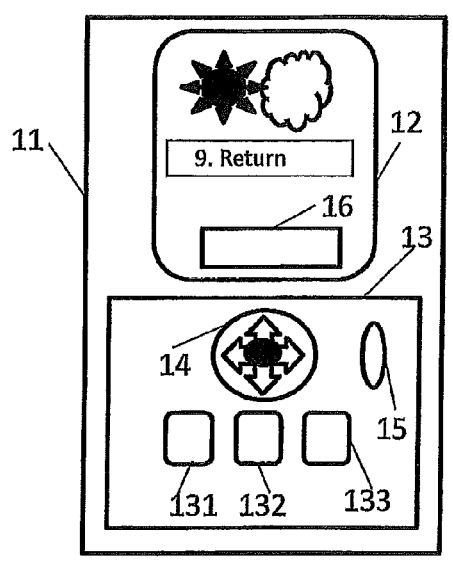
FIG. 4 presents another preferred embodiment of the user interface and display for the USSD client, purpose of the present invention, embedded in the mobile terminal and cooperating with another navigator available on the mobile.

FIG. 4 represents an embodiment of FIG. 2d. The USSD client includes a graphical transformation layer, which is able to translate data as enriched page and/or graphic, for example HTML page, as shown the example in FIG. 4.

The USSD client, as described in FIGS. 2, 3, 4 and 5 has the following features and advantages:

- Transparency of the connection for the user (induced by the USSD technology);
- Improved USSD interactivity for the user. The user has the possibility to perform at least one step of the method several times and to make at least one iteration of the steps using simple navigation keys;
- Support and management of the feature "ringing" when receiving an USSD message. The ringing feature, when either not present, or systematic for the terminal, represents a major and known disadvantage for service rendering. In order to compensate for this defect, the ringing option is either enabled, or disabled, or controlled by the user, the service, the network and/or the content;
- Support and management of the feature "Branding," customized advertisement for the promotion and the management of a brand. For example, a mode of implementation of this feature is a page such as HTML relative to an advertisement and/or brand and/or appellation, which is displayed as wallpaper;
- Support and management of the feature "Sponsoring," dynamic or static advertisement managed by the service and/or the USSD client, and displayed by the USSD client, for example in a reserved area;
- Display of the session information, as for instance the number of scrolled USSD pages, the number of at least one page, the display of at least one already selected choice, the "come back to" page in the memory cache at client level;
- Support and management of the terminal properties and of the network to which it is attached. The USSD client can decide to send these properties on demand or automatically during the USSD session, and to various network services. Thus, the USSD client manages, for example, parameters such as IMEI (International Mobile Equipment Identity), MCC (Mobile Country Code), MNC (Mobile Network Code), LAC (Local Area Code) and others.
- Support and management of the terminal properties regarding additional features relative to the applications implemented in a mobile phone (11) from terminals manufacturers, or applications from telecommunications operators, or from services providers, or from any third party; these applications being previously downloaded on the mobile terminal (11), or being located in any remote server to which the terminal (11) has access. For example, when the terminal has a geo-location feature, such as GPS (Global Positioning Service; positioning in the geographical-location), the client module (52) includes means to interpret and to manage geo-location information and services. In this case, by using client (52), the user has the ability to access not only standard geo-location services, but also high value added services, such as emergency services, tracking and alerts. Another embodiment, are the services related to the POI (Points of Interest). In a preferred embodiment, the feature "Branding," provides a customized advertisement and is performed relative to the geo-location of the user and/or his/her mobile phone (11). These embodiments for the management and support of terminal properties are also operational in case of geo-location performed by at least one cell of the mobile telecommunication network, or Cellular Identification, by using local area networks terminals, as for example WiFi (Wireless Fidelity; wireless local network) and others;
- Support and management of USSD "bookmark" feature or others. In a special embodiment, the book mark is tagged, for example. as a form that can be completed offline, outside a USSD session, thereby avoiding the inconvenience of session interruptions.

In another implementation, the bookmark is hierarchical; end-to-end data and services encryption. In the current 2G-3G mobile networks, the information conveyed by the USSD channel is not secure. Following requests from operators, users and third parties, this information is encrypted end-to-end by the USSD client at content and/or at service level. For example, for at least one USSD service, the user can install a custom security key or choose a security key automatically managed by the client (52) and the server (51).

In one implementation, the USSD client (52) proposed dynamically visual indication for the USSD security.

During navigation, or when out of navigation mode, the USSD client has the capability to save one or many pages in the terminal, and to send at least one selected page or at least one part of at least one selected page to the network, for example, as SMS (Short Message Service; short text message that can be transmitted and received from a mobile phone), as MMS (Multimedia Message Service; multimedia message that can be transmitted and received from a mobile phone), as email and other message forms. Also, the USSD client has the capability to do complete or partial archives of the session.

Indication and management of a "navigation skin" application, downloadable on mobile networks, and allowing operators to customize in the terminal the subscriber's navigation and/or services.

Additional applications available from navigation, for example, are applications that can be launched with a simple touch on specific text and/or graphic areas. There may be a feature for session restore form the USSD client.

This session restore option is active if a session is interrupted. The USSD client manages then an automatic restore by reconnecting to a network service, via any communication channel transparently to the navigation feature.

Feature for management and verification of the duration and the continuity of an USSD session. It is well known for persons skilled in the art, that the duration on an USSD session is unknown from the user, and that an USSD session in which the user remains passive for some time (for example during one minute), is interrupted without any indication. To improve the ergonomics of the USSD user interaction, the USSD client (52) provides visual management of the session, and of the session duration, as well as verification of the duration of the user inactivity and session continuity.

In one embodiment, the session is interrupted after a specified period of inactivity and a warning message is displayed on the screen (12) of the terminal (11). In another embodiment, the session is automatically extended in a transparent for the user manner, i.e. without displaying a warning message on the screen (12) of the terminal (11).

In another embodiment, the session is automatically extended in a transparent for the user manner, i.e. without displaying a warning message on the screen (12) of the terminal (11).

In yet another embodiment, the client (52) has means to customize this management of virtual USSD messages, i.e., the management of one or many USSD messages as at least one USSD message, or the virtual USSD message or the management of one or many USSD messages grouped in an USSD message; a long USSD message. By using USSD client, the dedicated to this long USSD message channel is, for example, used as a channel for downloading data, such as text, images, graphics or audiovisual contents.

An embodiment of the client-server system architecture, particularly of the USSD client module architecture. A purpose of the present invention, is presented in FIG. 5.

The mobile terminal (11) includes an USSD client module (52) software integrated with the native telecommunications platform of the mobile terminal (11).

The USSD client (52) includes a transport module (53), with services encryption module (535), which receives USSD data from any network (51), for example, from a network with an USSD Center (59), and transmits the USSD data via a link (531) to the module (54), which is the decoder interpreter.

The module (54) has, for example, a function to decode the USSD messages, and to convert them into a structured language.

The module (54) transmits the decoded data via a link (541) to a presentation module (55), for example, a transformation module using HTML language, or using any other presentation language. The function of the module (55) is to format the data for display.

Advantageously the presentation module (55) includes means to modify the processed content (modification, filtering, suppression, content addition and other functions).

The module (55) then sends, formatted for presentation, data via a link (551) to a module (56) such as standard WEB navigator (or "Browser"). Moreover, the USSD client (52) has the capability to communicate and to automatically adapt itself to at least one third client-server system, such as any USSD server, On-Device Portal (embedded portal) and others, and thus, in a transparent or declared manner for the server. The data provided from the navigator module (56) is sent via a link (561) to the display (12) of the terminal (11).

Figure 5:
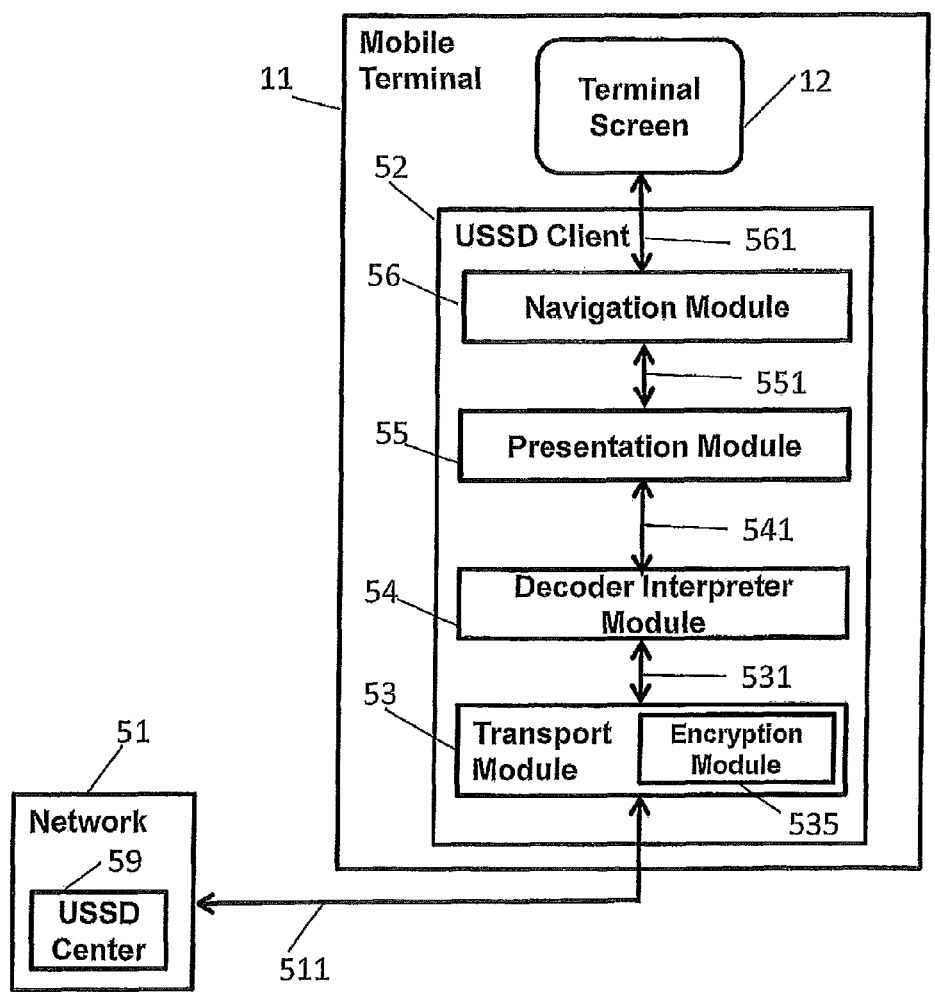
FIG. 5 presents a general architecture example of the client-server system, especially for the USSD client module embedded in the terminal.

The presented USSD client (52) architecture on FIG. 5, allows integration with at least one navigator, such as WEB or any other mobile terminal application or user application. In addition, this USSD architecture allows the USSD client to be embedded into at least one navigator such as WEB or any other mobile terminal or user application.

When a query is sent by the user to the network (51) via a link (511), a session is opened between the network (51) and the USSD client (52) which successively share data via the transport module (53), the decoder interpreter module (54), the presentation module (55) and the navigation module (56). The navigation module transmits the data for display at the required format via a link (561), and data is displayed on the screen (12) of the terminal (11).

The described features and characteristics of the USSD client are illustrative and not limiting embodiments. Many other features are implemented on demand or during a user customization of the USSD client.

Based on a native USSD standard, the USSD client, purpose of the present invention, is operational with any type of USSD network services.

The USSD client includes a graphic presentation enhancement module (56), supporting different user interface graphic presentations. These presentations are based on descriptors of structured languages and format, such as the standard formats CSS (Cascading Style Sheet; style sheet format for Internet Browsers), DOM (Document Object Model; document template independent of all programming languages and of all platforms), SMIL (Synchronized Multimedia Integration Language; language allowing the synchronization of different multimedia elements on a WEB page), SVG (Scalable Vector Graphics; description language for vectors graphic sets based on XML), LASER (Lightweight Application Scene Representation), SAF (Simple Aggregation Format; binary format for integration in the same stream LASER contents and audio/video contents), or such as proprietary formats as Macromedia Flash; or a kind of Rich Media format (formats using advanced techniques to transfer and display of multimedia data (audio, video, still images, graphics, text) and for interactive user interface).

In the generic case, the presentation is either as lists, or an any multimedia, or mixed.

Preferably, the USSD client (52) has the capability to manage advanced value added features, as for example:

Performs automatically restoration of interrupted USSD session. When an USSD session is interrupted, for example, due to expiration, data relative to the interruption point is sent to the USSD service by using a new USSD session.

In another embodiment, data relative to the interruption point is returned to an USSD service, for example, via the SMS channel. This allows the USSD service to reactivate the session from the referenced interruption point, thus, from the network to the USSD client. These two methods for recovery of an expired USSD session are transparent to the user.

Has the capability to commute an onging USSD session towards a phone call, SMS call, Internet call or another function.

Proposes options where the client analyzes service pages and performs a synchronization with the server in regards to available user options in the pages, i.e. performs a synchronization between pages stored on the server in memory "cache" (temporary saving in memory of at least one part of the session) and an ongoing page among already received pages.

Offers the possibility of restoring navigation history from the last session, or from at least one archived session;

Offers the possibility of performing one or many simultaneous choices from the same navigation page.

Has the capability of simulating and/or managing many parallel activated USSD sessions for the same terminal, thus allowing the user to navigate in many services in the same time.

In a preferred embodiment, this capability is implemented by sing memory "cache" at the USSD service and USSD client level.

Has the capability of controlling the USSD navigation via voice commands.

Had the capability of integrating a mobile terminal (11) having touch screen (12), and to ensure the navigation, as well as all described services. In this case, a simple user's touch on a specific area of the touch screen (12) allows him/her to reach a multitude of applications and services.

Has the capability of restoring the request from the user information via a voice synthesis.

Has the capability of operating in the terminal as an USSD server, in order to communicate with other terminal clients through or pass-through the mobile network. For example, it is used to take control of an USSD terminal by another terminal (USSD or not), for information retrieval from a terminal, for navigation and for remote launching of services on the terminal, for the transformation of an USSD terminal into any remote control equipment and/or into any application server. Has the capability of detecting a conventional USSD session and proposing navigation assistance or automatically overtaking the USSD session.

In one embodiment, the client-server system intelligence is located in the USSD client (52).

In another embodiment, the client-server system intelligence is located in the USSD service (51).

Furthermore, in another embodiment, the client-server system intelligence is located in the USSD service (51) and in the USSD client (52).

In a preferred embodiment, the digital telecommunications client system (52) for using of digital applications and services is based on at least one USSD protocol, the USSD client (52), and located in at least one mobile terminal (11). This USSD client includes means for receiving and interpreting at least one data and/or at least one instruction from at least one telecommunications network (51), means for displaying in text and/or in graphic on a screen (12) and for presenting on the mobile terminal (11) at least one data and/or at least one instruction from the network (51), means for interpreting and for sending back to the network (51) at least one request and/or at least one message of at least one user, in function of at least one data and/or at least one presented service and means for communicating with at least one server of at least one third party such as any USSD server, on-device-portal server or other. The USSD client (52) includes at least one transport module (53), including at least one encryption module (535), at least one decoder interpreter module (54) and at least one presentation module (55). It includes also at least one navigation module (56).

The invention claimed is:

1. A digital telecommunications system comprising a digital application that communicates with an unstructured supplementary service data protocol, the digital telecommunications system comprising:
    a digital application located on a mobile terminal, the digital application comprising a navigation module, a presentation module, an interpreter module and a transport module comprising an encryption module, wherein the digital application interprets data received from an unstructured supplementary service data protocol that communicates with a telecommunications network wherein the digital application displays on a screen of said mobile terminal interpreted data that the interpreter module of the digital application interprets from data received from the unstructured supplementary service data protocol; wherein the digital application is constructed to interpret a request of a user entered into the mobile terminal in response to the interpreted data displayed on the screen of the mobile terminal;
    the digital application is constructed to send from the mobile terminal data interpreted from the request of the user entered into the mobile terminal to said telecommunications network by the unstructured supplementary service data protocol; and
    wherein, unstructured supplementary service data is communicated from the telecommunications network to the mobile terminal, and the unstructured supplementary service data is received by the transport module comprising the encryption module, the transport module transmitting the unstructured supplementary service data to the interpreter module, and the interpreter module transmitting decoded data as a structured language to the presentation module.

2. The digital telecommunications system according to claim 1, wherein the digital application comprises the transport module and the transport module comprises the encryption module.

3. The digital telecommunications system according to claim 1, wherein the navigation module is a third party application and/or terminal specific application.

4. The digital telecommunications system according to claim 1, further comprising a transformation module that transforms information to a presentation language and the transformation module comprises means for modifying processed content.

5. The digital communications system according to claim 1, further comprising a transformation module, wherein the transformation module comprises a filter, a suppressor and a content supplier.

6. The digital communications system according to claim 1, wherein an unstructured supplementary service data center that is remote from the mobile terminal, and communicates with the mobile terminal by the unstructured supplementary service data protocol, comprises an interpreter of structured languages.

7. The digital communications system according to claim 1, wherein an unstructured supplementary service data center that is remote from the mobile terminal and communicates with the mobile terminal by the unstructured supplementary service data protocol is a server for terminals and networks 8. The digital communications system according to claim 1, wherein an unstructured supplementary service data server or an on-device portal server communicates with the mobile terminal by the unstructured supplementary service data protocol.

9. A telecommunications processing method performed by a digital application comprising an unstructured supplementary service protocol, the method comprising the steps of:
    communicating with a telecommunications network by an unstructured supplementary service data protocol using a digital application located on a mobile terminal, the digital application comprising a navigation module, a presentation module, an interpreter module and a transport module comprising an encryption module;
    interpreting data received by the digital application from the unstructured supplementary service data protocol that communicates with the telecommunications network;
    displaying on a screen of the mobile terminal interpreted data that the interpreter module of the digital application interprets from data received from the unstructured supplementary service data protocol;
    the digital application interpreting a request of a user that is entered into the mobile terminal in response to the interpreted data displayed on the screen of the mobile terminal; and
    sending from the digital application of the mobile terminal data that is interpreted from the request of the user to said telecommunications network by the unstructured supplementary service data protocol,
    wherein, unstructured supplementary service data is communicated from the telecommunications network to the mobile terminal, and the unstructured supplementary service data is received by the transport module comprising the encryption module, the transport module transmitting the unstructured supplementary service data to the interpreter module, the interpreter module transmitting decoded data as a structured language to the presentation module.

10. The telecommunications processing method performed by a digital application comprising an unstructured supplementary service protocol according to claim 9, the method further comprising the steps of:
- sending a query from the user via the digital application and by the unstructured supplementary service protocol to the telecommunications network;
- opening a session between the digital application comprising the unstructured supplementary service protocol and the telecommunications network; and
- querying interpretation from the telecommunications network, followed by a return of information to the mobile terminal.

11. The telecommunications processing method performed by a digital application comprising an unstructured supplementary service protocol according to claim 9, wherein the request of the user is entered in response to a specific area of a display and entry of a command into the mobile terminal.

12. The telecommunications processing method performed by a digital application comprising an unstructured supplementary service protocol according to claim 9, further comprising the step of supporting and managing customized information during a session.

13. The telecommunications processing method performed by a digital application comprising an unstructured supplementary service protocol according to claim 9, further comprising the step of supporting and managing customized information during a session, wherein the customized information is a feature advertisement.

14. The telecommunications processing method performed by a digital application comprising an unstructured supplementary service protocol according to claim 9, further comprising the step of supporting and managing customized information during a session, wherein the customized information is dynamic.

15. The telecommunications processing method performed by a digital application comprising an unstructured supplementary service protocol according to claim 9, further comprising the step of supporting and managing properties of the mobile terminal and the communications network with which the mobile terminal communicates by the unstructured supplementary service protocol.

16. The telecommunications processing method performed by a digital application comprising an unstructured supplementary service protocol according to claim 9, further comprising the step of supporting and managing a feature of an application supplied by a terminal manufacturer and/or supplied by a telecommunications operator or services provider, the application being present on the mobile terminal or in a remote server to which the mobile terminal has access.

17. The telecommunications processing method performed by a digital application comprising an unstructured supplementary service protocol according to claim 9, further comprising the step of supporting and managing a feature of an unstructured supplementary service data bookmark.

18. The telecommunications processing method performed by a digital application comprising an unstructured supplementary service protocol according to claim 9, further comprising the step of externalizing content of a current page, and/or of a session or portion of a session, wherein said step of externalizing content is performed as a transfer of content from the digital application comprising the unstructured supplementary service data protocol to an external application.

19. The telecommunications processing method performed by a digital application comprising an unstructured supplementary service protocol according to claim 9, further comprising the step of restoring a session on said mobile terminal.

20. The telecommunications processing method performed by a digital application comprising an unstructured supplementary service protocol according to claim 9, further comprising the step of visually managing a session, said step of visually managing the session comprising visual management of a duration of said session, visual management of a duration of the user's interactivity during said session and verification of continuity of said session.

21. The telecommunications processing method performed by a digital application comprising an unstructured supplementary service protocol according to claim 9, further comprising the step of managing a session, said step of managing the session comprising management of a plurality of unstructured supplementary service data messages.

22. The telecommunications processing method performed by a digital application comprising an unstructured supplementary service protocol according to claim 9, further comprising the step of managing a session, said step of managing the session comprising management of unstructured supplementary service data messages, wherein each of the unstructured supplementary service data messages is a virtual unstructured supplementary service data message comprising text, graphic or audiovisual content.

23. The telecommunications processing method performed by a digital application comprising an unstructured supplementary service protocol according to claim 9, further comprising the step of simulating unstructured supplementary service data sessions operating in parallel on the same terminal.

24. The telecommunications processing method performed by a digital application comprising an unstructured supplementary service protocol according to claim 9, further comprising the step of customizing a service for a user by the digital application communicating by the unstructured supplementary service protocol remotely with said telecommunications network.

25. The telecommunications processing method performed by a digital application comprising an unstructured supplementary service protocol according to claim 9, further comprising the steps of installing a custom security key and encrypting data and a service with the custom security key, wherein the custom security key is automatically managed by the digital application comprising an unstructured supplementary service protocol and the telecommunications network.

26. The telecommunications processing method performed by a digital application comprising an unstructured supplementary service protocol according to claim 9, further comprising the steps of:
- displaying on the screen of the mobile terminal interpreted data as text and/or graphic information;
- validating the user request entered into the mobile terminal;
- interpreting the user request by the telecommunications network; and
- displaying the interpreted user request received by the telecommunications network on the mobile terminal screen.

27. The digital communications system according to claim 1, wherein the presentation module shares data with the navigation module, and the navigation module transmits data in a required format for display on the screen of the mobile terminal.

28. The telecommunications processing method performed by a digital application comprising an unstructured supplementary service protocol according to claim 9, wherein the presentation module shares data with the navigation module, and the navigation module transmits data in a required format for display on the screen of the mobile terminal.

* * * * *